Dec. 2, 1924.

R. W. WOOD 1,517,332

SIGNALING SYSTEM

Filed Oct. 30, 1919

Robert W. Wood, Inventor

Patented Dec. 2, 1924.

1,517,332

UNITED STATES PATENT OFFICE.

ROBERT W. WOOD, OF BALTIMORE, MARYLAND.

SIGNALING SYSTEM.

Application filed October 30, 1919. Serial No. 334,464.

*To all whom it may concern:*

Be it known that I, ROBERT W. WOOD, a citizen of the United States, residing at Baltimore, in the county of Baltimore City and State of Maryland, have invented certain new and useful Improvements in Signaling Systems, of which the following is a specification.

This invention relates to signaling by means of light flashes, and has particular reference to a system and apparatus therefor whereby messages being transmitted from one point to another by the military forces during times of war are rendered invisible to the enemy, and in fact may be perceived only by those persons for whom they are intended.

In this system which is primarily intended for use during the hours of daylight, only the rays of light at the extreme red end of the visible spectrum, which for convenience we may term infra red rays, are utilized. To be more definite, the term "infra red rays" is intended to embrace those red rays of the light spectrum situated between the bright red rays and the invisible rays. In other words, they are extreme red rays of low visibility. These rays, the action of which on the eye is comparatively feeble, are invisible when projected, due to the fact that they are masked by the blinding glare of daylight.

Secrecy of messages sent under this system is further assured by the use of transmitting mean for the light flashes which, aside from emitting only infra red rays projects those rays in an extremely narrow beam which covers a very small, predetermined area at the receiving station.

In order to secure this extremely narrow beam, use is made of my flash telescope on which application for Letters Patent was filed February 25, 1919, Serial Number 279,038, in conjunction with which means are provided to produce the desired infra red rays.

Other and further advantages will appear as the nature of my invention is better understood from consideration of the following description taken in conjunction with the drawings, in which like numerals indicate the same parts throughout the several views, of which—

Figure 1:
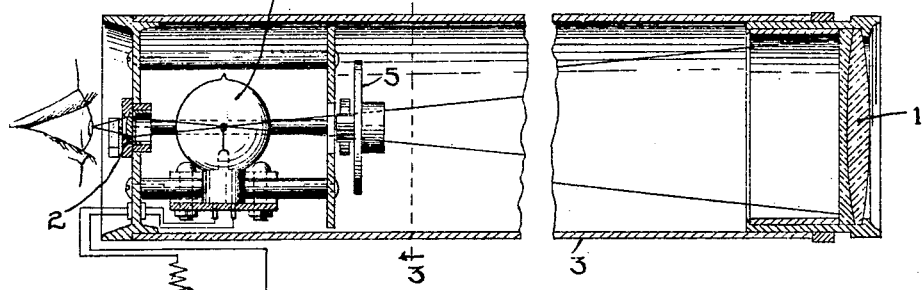

Fig. 1, represents my flash telescope provided with means for projecting and receiving infra red rays.

Figure 2:
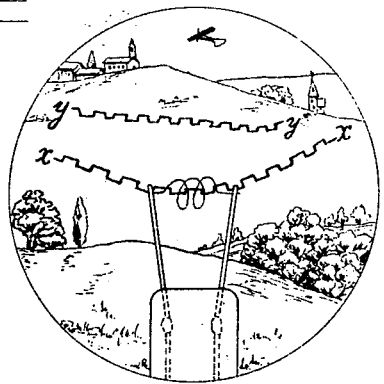
Figure 3:
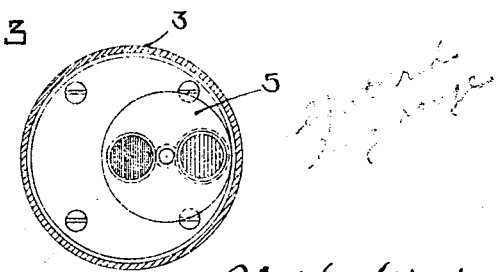

Fig. 2, a landscape image seen through the eye piece device shown in Fig. 1, illustrating the manner in which the filament of the flash lamp appears superimposed on the image, and Fig. 3, a section taken on line 3—3 of Fig. 1 showing more clearly the relation of the means for producing the infra red rays with which the flash telescope is provided, to the other parts thereof.

In carrying out the present invention, use is made of my flash telescope, the same being shown in Fig. 1, provided with means for transmitting rays of bright light which issue from the electric flash into infra red rays. The flash telescope itself is adapted to project light flashes in an extremely narrow beam to any point desired and over a predetermined area. This is accomplished by so arranging the objective lens 1 and the eye piece lens 2 that they have a common focus within telescope 3, at which point lamp 4 is located with its filament in the common focal plane. With this arrangement, when lamp 4 is lighted, an illuminated image of the filament thereof will be projected on the object at which telescope 3 is aimed. Consequently, as the rays of light from lamp 4 are projected only on the limited area covered by the illuminated figure of the lamp filament, they are visible only from points within that area.

Fig. 2 illustrates the manner in which the flash telescope is sighted on the point to which it is desired to transmit signals. Assume that it is desired to establish signal communication with the front line trench, indicated by XX from a signaling station at headquarters without the signals being observed from the enemies trench, indicated by YY. On observing through eye piece lens 2 of the telescope, an image of the landscape, such as that shown in Fig. 2, will be seen with a magnified image of the spiral filament of lamp 4 superimposed thereon. This is due to the fact that the filament is located in the common focal plane of both the objective and eye piece lenses of the telescope, on which plane also an immage of the landscape is projected. Hence, when lamp 4 is operated to flash light signals to the distant station in trench XX, the signals are projected accurately to that station and are visible only within the area which is seen to be covered by the spiral filament of the lamp in the instrument at the sending station.

Telescope 1 is provided with means located in front of lamp 4 for transmitting the light issuing from said lamp into infra red rays, these means consisting preferably, of light red and dark red color screens or ray filters mounted in wheel 5. Filter wheel 5 is provided with suitable means for rotating the same, whereby any desired ray filter may be brought into position in order that the light rays from lamp 4 may pass therethrough. Ordinarily only two infra red filters are provided in the flash telescope, one light, for long range work and one dark, for short range work. These filters are especially constructed of aniline dyes as ordinary red glass will not answer as it transmits too wide a range of the spectrum, and exercises considerable absorption on the rays which it transmits.

The comparatively feeble red rays which are projected after the flashes of light from lamp 4 pass through a ray filter are soon lost in the blinding glare of daylight, but can be seen without difficulty if the eyes of the observer are protected with some means, such as goggles, which transmit only the same rays as those projected by lamp 4. This reduces the intensity of the daylight to an enormous degree without appreciably reducing the intensity of the dark red rays projected from the distant lamp, which appears as a bright light on an almost black landscape.

While goggles such as mentioned may be used, it has been found that better results may be obtained by using the flash telescope itself for the reception of the signals, by bringing the light infra red filter into position and observing through it. Much longer ranges can be covered in this way, due to the magnifying power of the telescope. With either the light or dark filter, the flashes are visible to the naked eye or in ordinary binoculars up to a certain distance, if the observer is within the restricted light beam and lamp 4 is operated at full intensity. Thus, for very short range work, the intensity of the filament of lamp 4 must be reduced by cutting in a certain amount of the adjustable resistance 6. In general it will be found that the infra red signals can be seen by means of the red filter for a distance of some four or five times as great as without the filter, this ratio holding for observations with the naked eye and with the eye protected with goggles equipped with the filter, or for observations by the telescope without and with the light infra red filter in position. The dark infra red filter is used only for sending, never for receiving.

In sending messages from the rear to the front, conditions should be so adjusted that the signals are invisible through the telescope to the observer except when the light infra red filter is in position. In this way, it is assured that the signals are invisible to an enemy observer, even with powerful binoculars, even though he be in line with the light beam and only say a hundred yards distant.

The following table has been prepared from observation made with one of the flash telescopes equipped with means for producing infra red rays:—

*Stations one-half mile distant.*

| Sending. | Receiving. |
|---|---|
| Light red—Naked eye | Visible. |
| Naked eye | Invisible. |
| Dark red—Telescope without filter | Visible. |

*One mile distant.*

| | |
|---|---|
| Light red—Naked eye | Invisible. |
| Telescope without red filter | Visible. |
| Dark red—Naked eye | Invisible. |
| Telescope without red filter | Invisible. |
| Telescope with red filter | Very bright. |

*One and one-half miles distant.*

| | |
|---|---|
| Light red—Naked eye | Invisible. |
| Telescope without red filter | Very faint. |
| Telescope with red filter | Very bright. |
| Dark red—Naked eye | Invisible. |
| Telescope without filter | Invisible. |
| Telescope with red filter | Easily visible. |

*Two miles distant.*

| | |
|---|---|
| Dark red—Naked eye | Invisible. |
| Telescope without red filter | Invisible. |
| Telescope with red filter | Easily visible. |

*Two and one-half miles distant.*

| | |
|---|---|
| Light red—Naked eye | Invisible. |
| Telescope without red filter | Trace. |
| Telescope with red filter | Easily visible. |
| Dark red—Naked eye | Invisible. |
| Telescope without red filter | Invisible. |
| Telescope with red filter | Visible. |

*Three miles distant.*

| | |
|---|---|
| Light red—Naked eye | Invisible. |
| Telescope without red filter | Invisible. |
| Telescope with red filter | Visible. |
| Dark red—Visible only in telescope with red filter. | |

*Five and one-half miles distant.*

Light red—Visible only in telescope with red filter.

As an example of the use of the above table, suppose that it is desired to signal over a half-mile range. The table shows that even with the dark red filter in position, the signals can be seen through the telescope or with binoculars without the aid of a red filter. This means that an enemy not more than one or two hundred yards beyond the observer might possibly see the signals through his binoculars. Thus the intensity of the lamp must be reduced somewhat by means of the adjustable resistance, until the signals can be seen at the receiving station only with the aid of the red filter in position in the receiving telescope.

It is not desired to confine this invention to the specific details described except as pointed out in the claims, or to the uses described, as the same may be readily adapted to use in various fields where it is desirous to establish signal communication between distant points.

What I claim is:

1. In a signaling apparatus, a sending and receiving device including light projecting means, means for selectively transmitting only light rays of low visibility, and means for varying the intensity of the projected light.

2. In a signaling apparatus, a sending and receiving device including an objective lens, an eyepiece lens having its focus in common with that of the objective lens, a source of light located at the said common focus, and means for transmitting light rays of low visibility exclusively.

3. In a signaling apparatus for sending light signals exclusively to a selected area, a telescope barrel, an objective, an eyepiece, the said objective and eyepiece having a common focal plane within the barrel, a flashlamp within the barrel and having its filament located in the said common focal plane, and means for transmitting light rays of low visibility exclusively.

4. In a signaling apparatus, a telescope including an objective and an eyepiece having a common focal plane, a source of light located in the said focal plane, and means disposed intermediate of the source of light and objective for transmitting light rays of low visibility exclusively.

5. In a signaling apparatus, an objective, and an eyepiece having a common focal plane, an electric flashlamp having its filament located in the said focal plane, means for varying the luminosity of the lamp filament, and means for transmitting light rays from the lamp of low visibility exclusively.

6. In a system for secret signaling the combination with means for transmitting a pencil of the extreme red light rays of low visibility from a sending station, and means at a receiving station for detecting said low visibility rays.

7. In a system for secret signaling the combination with means for transmitting a pencil of the extreme red light rays of low visibility from a sending station, and means for increasing the visibility of said light rays at a receiving station.

In testimony whereof I have affixed my signature.

ROBERT W. WOOD.